(12) United States Patent
Wu et al.

(10) Patent No.: US 10,802,548 B2
(45) Date of Patent: Oct. 13, 2020

(54) ELECTRONIC DEVICE

(71) Applicants: Tung-Ying Wu, Taipei (TW);
Ming-Chung Liu, Taipei (TW);
Kuan-Chang Lee, Taipei (TW)

(72) Inventors: Tung-Ying Wu, Taipei (TW);
Ming-Chung Liu, Taipei (TW);
Kuan-Chang Lee, Taipei (TW)

(73) Assignee: COMPAL ELECTRONICS, INC.,
Taipei (TW)

( * ) Notice: Subject to any disclaimer, the term of this patent is extended or adjusted under 35 U.S.C. 154(b) by 59 days.

(21) Appl. No.: 16/127,235

(22) Filed: Sep. 11, 2018

(65) Prior Publication Data

US 2019/0079563 A1 Mar. 14, 2019

Related U.S. Application Data

(60) Provisional application No. 62/557,118, filed on Sep. 11, 2017.

(51) Int. Cl.
*G06F 1/16* (2006.01)

(52) U.S. Cl.
CPC ............ *G06F 1/1679* (2013.01); *G06F 1/166* (2013.01); *G06F 1/1607* (2013.01); *G06F 1/1616* (2013.01); *G06F 1/1618* (2013.01); *G06F 1/1624* (2013.01); *G06F 1/1637* (2013.01)

(58) Field of Classification Search
CPC .... G06F 1/1679; G06F 1/1607; G06F 1/1616; G06F 1/1618; G06F 1/1624; G06F 1/1637; G06F 1/166; G06F 1/1632; G06F 1/1633; G06F 1/1654
See application file for complete search history.

(56) References Cited

U.S. PATENT DOCUMENTS

| | | | | |
|---|---|---|---|---|
| 5,229,920 A * | 7/1993 | Spaniol | ................. | G06F 1/1616 292/267 |
| 6,229,693 B1 * | 5/2001 | Karidis | ................. | G06F 1/1616 361/679.05 |
| 6,295,038 B1 * | 9/2001 | Rebeske | ............... | G06F 1/1616 345/1.1 |
| 6,480,373 B1 * | 11/2002 | Landry | ................. | G06F 1/1616 16/308 |
| 6,768,635 B2 * | 7/2004 | Lai | ........................ | G06F 1/1616 248/351 |
| 7,466,306 B2 * | 12/2008 | Connor | ................. | G06F 1/1616 345/1.1 |
| 7,898,796 B2 * | 3/2011 | Horie | ........................ | G06F 1/16 361/679.02 |
| 8,730,669 B2 * | 5/2014 | Locker | ................. | G06F 1/1615 345/169 |

(Continued)

FOREIGN PATENT DOCUMENTS

CN 204256591 4/2015
TW M351161 2/2009

*Primary Examiner* — Anthony Q Edwards
(74) *Attorney, Agent, or Firm* — JCIPRNET

(57) ABSTRACT

An electronic device including a first body and a second body pivoted to each other is provided. The first body includes a frame, a display assembled an inner side of the frame, and a latch assembly disposed within the frame to lock or release the display. When the first body and the second body are rotated relatively to a tent position, the display is released by the latch assembly so as to be moved along the frame.

23 Claims, 11 Drawing Sheets

(56) References Cited

U.S. PATENT DOCUMENTS

| | | | | |
|---|---|---|---|---|
| D873,816 S * | 1/2020 | Wu | ............................ | D14/315 |
| 2003/0142469 A1 * | 7/2003 | Ponx | ..................... | G06F 1/1616 |
| | | | | 361/679.04 |
| 2004/0125549 A1 * | 7/2004 | Iredale | .................. | G06F 1/1616 |
| | | | | 361/679.06 |
| 2006/0152893 A1 | 7/2006 | Chen | | |
| 2008/0024388 A1 * | 1/2008 | Bruce | .................. | G06F 1/1616 |
| | | | | 345/1.1 |
| 2009/0320244 A1 * | 12/2009 | Lin | ...................... | E05D 11/087 |
| | | | | 16/362 |
| 2010/0014229 A1 * | 1/2010 | Horie | ........................ | G06F 1/16 |
| | | | | 361/679.01 |
| 2010/0053876 A1 * | 3/2010 | Widmer | ................ | G06F 1/1616 |
| | | | | 361/679.27 |
| 2010/0232096 A1 * | 9/2010 | Chen | ..................... | G06F 1/1618 |
| | | | | 361/679.01 |
| 2010/0306501 A1 * | 12/2010 | Chang | ................... | G06F 1/1643 |
| | | | | 712/31 |
| 2011/0216483 A1 * | 9/2011 | Vesely | ................... | B60N 3/004 |
| | | | | 361/679.01 |
| 2012/0086658 A1 * | 4/2012 | Moradian | ............. | G06F 1/1641 |
| | | | | 345/173 |
| 2012/0243164 A1 * | 9/2012 | Lin | ......................... | G06F 1/162 |
| | | | | 361/679.27 |
| 2013/0069878 A1 * | 3/2013 | Li | ......................... | G06F 1/1616 |
| | | | | 345/168 |
| 2013/0257733 A1 * | 10/2013 | Moore | .................. | G06F 1/1618 |
| | | | | 345/168 |
| 2017/0177036 A1 * | 6/2017 | Pan | ....................... | G06F 1/1654 |
| 2019/0258300 A1 * | 8/2019 | Gerardi | ................ | G06F 1/1618 |

\* cited by examiner

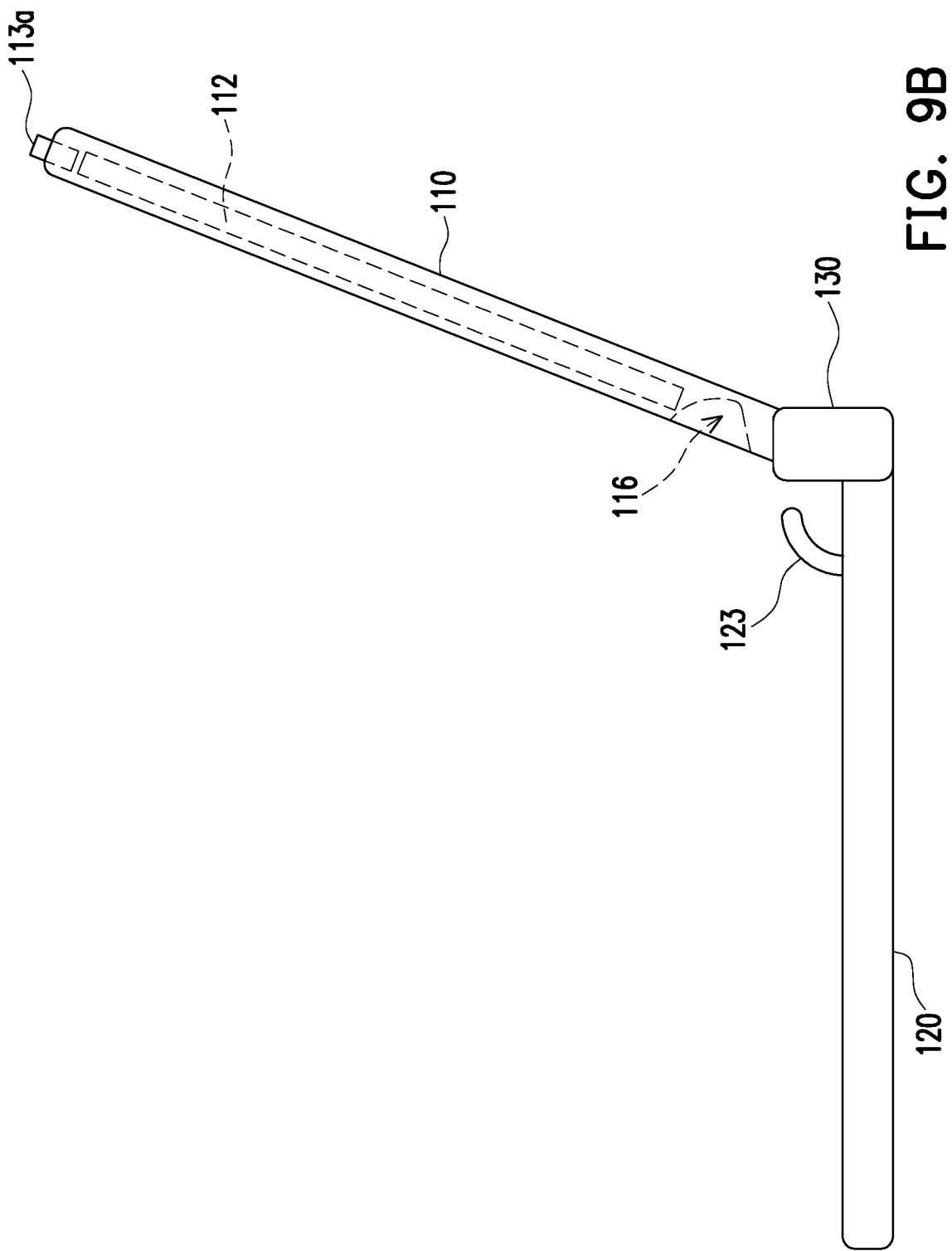

ELECTRONIC DEVICE

CROSS-REFERENCE TO RELATED APPLICATION

The application of the priority benefit of U.S. provisional application Ser. No. 62/557,118, filed on Sep. 11, 2017. The overall of the above-mentioned patent application is hereby incorporated by reference herein and made a part of this specification.

TECHNICAL FIELD

The invention relates to an electronic device.

DESCRIPTION OF RELATED ART

Since electronic devices, such as notebook computers, have the same functions as those of general desktop computers, and the slim and light design allows users to carry them conveniently, the electronic devices have become indispensable tools for some users. As the price of the electronic devices continues to drop, more and more users are replacing their desktop computers with the electronic devices.

Generally, an electronic device is composed of a host computer and a screen. In order to ensure the versatility of operation and the manner of using the electronic devices in compliance with consumers' requirements, most electronic devices also support a screen flip function, which allows the screen to be flipped back to the rear, so that the users located behind the electronic device can view the screen.

However, in the different operation modes provided above, the screen may not conform to the viewing angle of the users, causing inconvenience and discomfort to the users.

SUMMARY

The invention provides an electronic device. When a second body of the electronic device is flipped over a first body of the electronic device to a tent position, a user is able to further adjust a viewing angle of a display of the electronic device relative to the user as needed.

The invention provides an electronic device including a first body and a second body pivoted to each other, the first body and the second body are pivoted and fixed in an upright position on a platform and thus are in a tent state. The first body includes a frame, a display, and a latch assembly. The display is assembled to an inner side of the frame. The latch assembly is disposed within the frame to lock or release the display. When the first body and the second body are rotated relatively to a tent position, the display is released by the latch assembly so as to be moved along the frame.

In the invention, the electronic device includes a first body and a second body, and the first body includes a frame, a display, and a latch assembly. The frame has a first side and a second side opposite to each other. The display is assembled to an inner side of the frame. The latch assembly is disposed within the frame to lock or release the display. The second body is pivotally connected to first body, wherein the first side of the frame is away from a pivotal connection portion of the first body and the second body, and the second side of the frame is adjacent to the pivotal connection portion of the first body and the second body. When the first body and the second body are rotated relatively to a tent position, the display is released by the latch assembly so as to be moved toward the second side of the frame.

In an embodiment of the invention, the frame has a first side and a second side opposite to each other, the first side is away from a pivotal connection portion of the first body and the second body, and the second side is adjacent to the pivotal connection portion of the first body and the second body. The latch assembly has a pushing portion located at the first side, the frame further has an opening located at the second side, the display is released by the latch assembly through the pushing portion being received a force, and at least one portion of the display is moved out of the frame through the opening.

In an embodiment of the invention, the latch assembly includes a first part and a second part. The first part is movably disposed in the frame and has a pushing portion and a first driving portion, and the pushing portion is protruded out of the frame. The second part is movably disposed in the frame and has a latching portion and a second driving portion, and the first driving portion is movably engaged to the second driving portion. The first part is adapted to move via a force applied to the pushing portion, such that the first part pushes the second part via the engagement of the first driving portion and the second driving portion, and the latching portion is retracted from the locking slot of the display to release the display.

In an embodiment of the invention, the first part is movably disposed in the frame along a first axis, the second part is movably disposed in the frame within a second axis, and each of the first driving portion and the second driving portion has a wedge-shaped surface inclined to the first axis and the second axis.

In an embodiment of the invention, the first axis is orthogonal to the second axis.

In an embodiment of the invention, the second part has a groove, and the first driving portion of the first part is movably latched to the groove.

In an embodiment of the invention, a size of the groove along the second axis is greater than a size of the first driving portion along the second axis.

In an embodiment of the invention, the latch assembly further includes a first spring and a second spring, the first spring is disposed between the frame and the first part along the first axis, and the first spring constantly drives the pushing portion to protrude from the frame. The second spring is disposed between the second part and the frame along the second axis.

In an embodiment of the invention, a third spring disposed between the frame and a wing portion of the display is also included. When the display is assembled within the frame, the third spring is in a compressed state. When the display is released by the latch assembly, the third spring drives the display to move along the inner side of the frame.

In an embodiment of the invention, the display has a wing portion, and the frame further has a stopper portion which stops on a moving path of the wing portion.

In an embodiment of the invention, the display further has a first positioning portion located at the wing portion, and the frame further has at least one second positioning portion located on the moving path of the wing portion and between the stopper portion and the latch assembly. When the display is released by the latch assembly, the display moves along the inner side of the frame until the first positioning portion is temporarily positioned at the at least one second positioning portion.

In an embodiment of the invention, wherein the frame has a plurality of second positioning portions, the first positioning portion is temporarily positioned at one of the second positioning portions being closest to the latch assembly after the display being released by the latch assembly, and the first positioning portion is moved from the one of the second positioning portions and positioned at another one of the second positioning portions while the display being forced by a user.

In an embodiment of the invention, a pin disposed at the second body and corresponding to the latch assembly is also included. When the first body and the second body are folded together, the pin is latched to the latch assembly to brake an operation of the latch assembly.

In an embodiment of the invention, a pin disposed at the second body is also included, and the first body has a slot disposed at the frame and located on a moving path of the display. When the first body and the second body are folded together, the pin is inserted into the slot to block the display.

In view of the above, the electronic device has the first body and the second body pivotally connected to each other, such that the bodies are adapted to be flipped or rotated relatively, wherein the first body is composed of the frame, the display, and the latch assembly. The display is assembled to the inner side of the frame, and the latch assembly is disposed within the frame to lock or release the display. Thereby, when the first body and the second body are rotated relatively, especially the first body is flipped back to the rear of the second body, and the first body and the second body are adapted to be placed on the platform in an upright position. At this time, the electronic device is in a tent state, and the display is released by the latch assembly and moved along the inner side of the frame. As such, the user can further adjust the height and the viewing angle of the display as needed, so as to improve the convenience and comfort of operating while the electronic device being in the tent state.

To make the above features and advantages provided in one or more of the embodiments of the invention more comprehensible, several embodiments accompanied with drawings are described in detail as follows.

BRIEF DESCRIPTION OF THE DRAWINGS

FIG. 9A and FIG. 9B are simple side views showing different states of an electronic device according to an embodiment of the invention.

DESCRIPTION OF THE EMBODIMENTS

Figure 1:
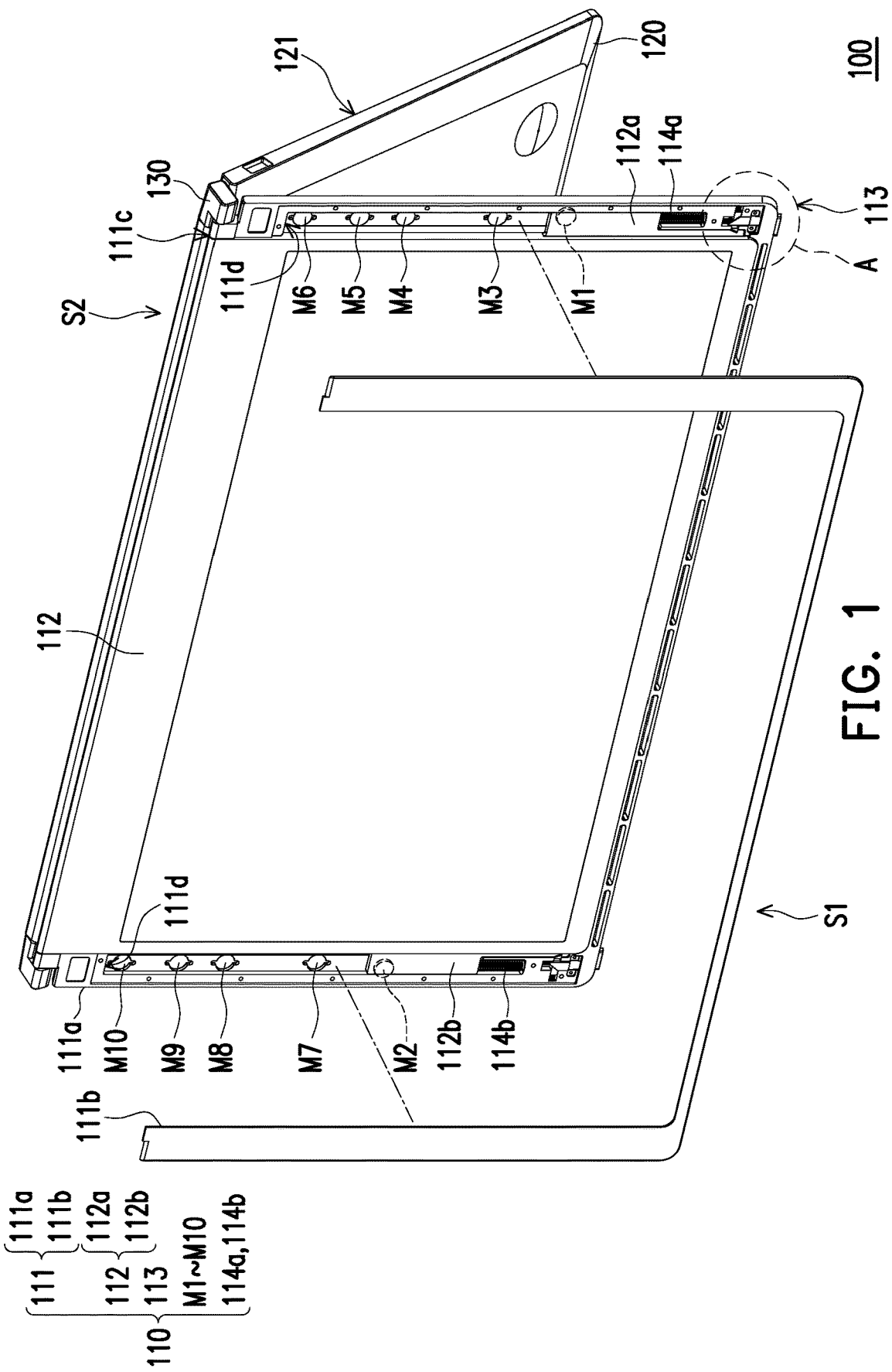
FIG. 1 is an assembly view of some components of an electronic device according to an embodiment of the invention.
Figure 2:
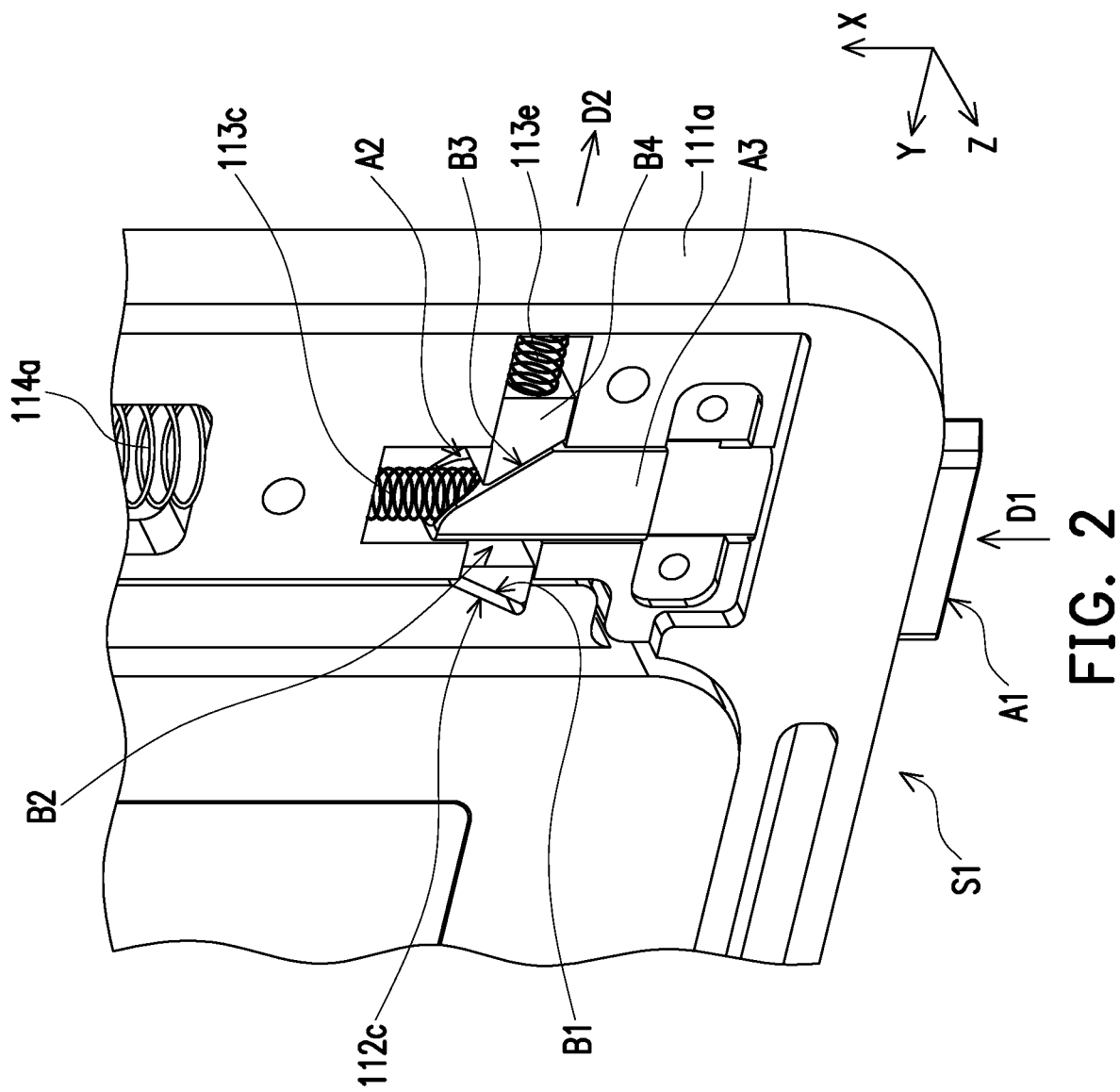
FIG. 2 is an enlarged view of a portion A of the electronic device depicted in FIG. 1.
Figure 3:
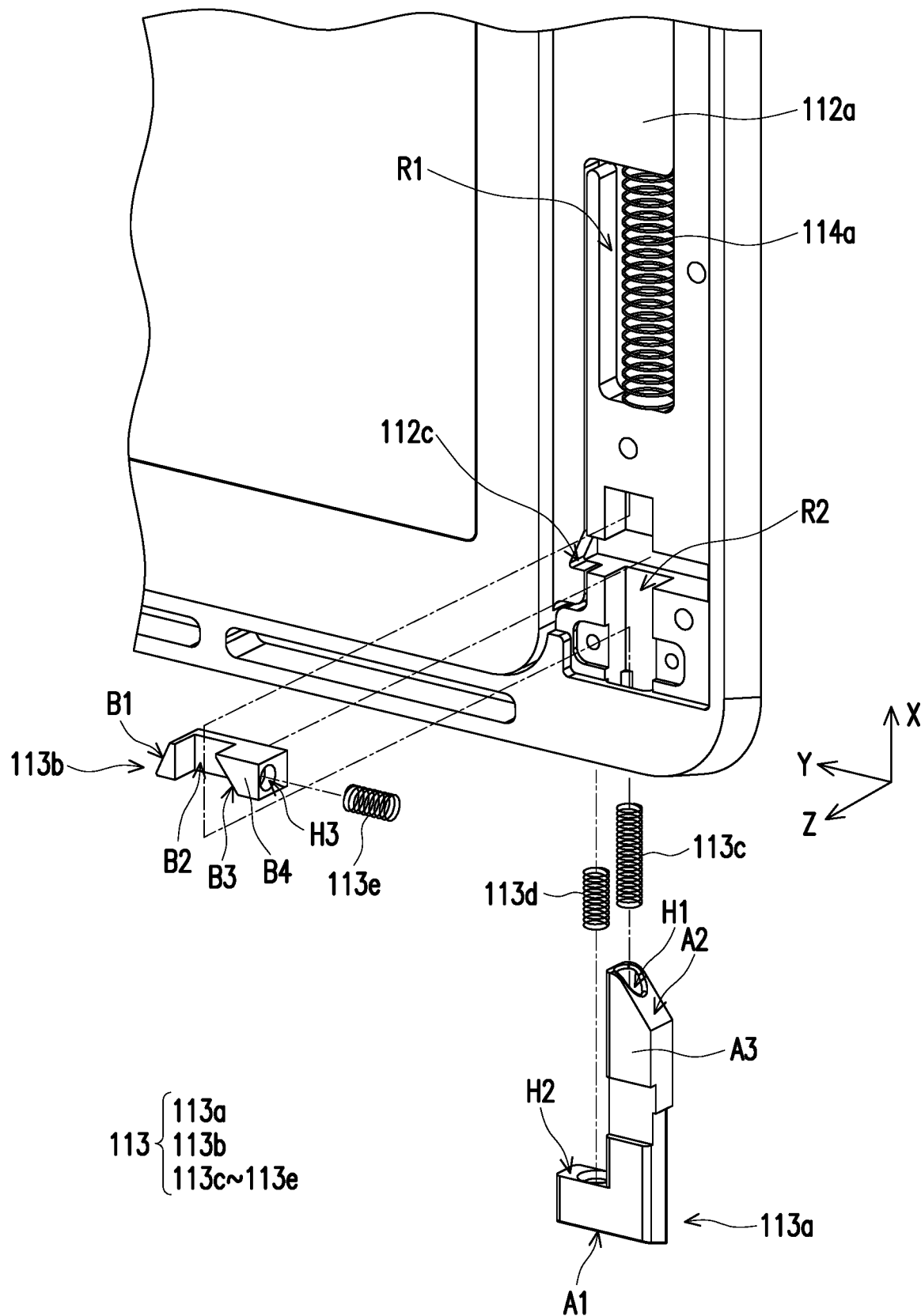
FIG. 3 is an exploded view of a part of components of the electronic device depicted in FIG. 1.

FIG. 1 is an assembly view of some components of an electronic device according to an embodiment of the invention. FIG. 2 is an enlarged view of a portion A of the electronic device depicted in FIG. 1. FIG. 3 is an exploded view of a part of components of the electronic device depicted in FIG. 1. With reference to FIG. 1 to FIG. 3, in the present embodiment, the electronic device 100 is, for instance, a notebook computer including a first body 110, a second body 120, and a hinge 130, wherein a display 112 is disposed at the first body 110, and the hinge 130 is connected between the first body 110 and the second body 120, so that the first body 110 and the second body 120 may be pivoted and rotated relative to each other through the hinge 130 to generate a plurality of operation modes. As shown in the related drawings, the first body 110 provided in the present embodiment pivots and rotates relative to the second body 120 through the hinge 130 and flips over from an input side 121 of the second body 120 to a position opposite to the input side 121. At this time, the user is able to stand the first body 110 and the second body 120 in an upright position on a platform (not shown), and the first body 110 and the second body 120 appear to have an inverted V shape. Thereby, the electronic device 100 may bring visual enjoyment to the user or perform a browsing function through the display 112. Here, the electronic device 100 in the inverted V shape is defined as a tent state. However, as the user's requirements for the viewing angle may change, the existing fixed display screen cannot satisfy the needs of the user. Hence, the structural adjustment of the first body 110 is provided in the present embodiment, and the aforesaid issues can be resolved.

To be specific, the first body 110 provided in the present embodiment further includes a frame 111 and a latch assembly 113, wherein the frame 111 composed of a main structure 111a and a front cover 111b is in U-shaped, the display 112 is movably assembled to an inner side of the frame 111, and the latch assembly 113 is disposed at a corner within the frame 111, i.e., in an accommodation region R2 formed after the main structure 111a and the front cover 111b are assembled. The frame 111 has a first side S1 and a second side S2 opposite to each other, the first side S1 is away from a pivotal connection portion (the hinge 130) of the first body 110 and the second body 120, and the second side S2 is adjacent to the pivotal connection portion of the first body 110 and the second body 120. The latch assembly 113 has a pushing portion A1 located at the first side S1, the frame 111 further has an opening 111c located at the second side S2, and the display 112 is adapted to be released by the latch assembly 113 through the pushing portion A1 being received a force, and at least one portion of the display 112 is moved out of the frame 111 through the opening 111c, so as to adjust a position of the display 112 relative to the frame 111.

With reference to FIG. 3, a Cartesian coordinate X-Y-Z is provided here for better descriptions of the positions and corresponding relations of the components. The latch assembly 113 includes a first part 113a a and second part 113b, the first part 113a is movably disposed in a main structure 111a of the frame 111 along an x-axis, the first part 113a has the pushing portion A1 and a first driving portion A3, and the pushing portion A1 partially protrudes from the main structure 111a of the frame 111 along the x-axis. The second part 113b is movably disposed in the main structure 111a of the frame 111 along a y-axis, the second part 113b has a latching portion B1 and a second driving portion B4, and the first driving portion A3 is movably engaged to the second driving portion B4. Particularly, each of the first driving portion A3 and the second driving portion B4 has a wedge-shaped surface A2, B3 inclined to the x-axis and the y-axis. With reference to FIG. 2 and FIG. 3, when the first part 113a and the second part 113b are arranged in the accommodation region R2, the first driving portion A3 of the first part 113a is movably latched to a groove B2 of the second part 113b, so that the two are crisscrossed, and a size of the groove B2 along the y-axis is greater than a size of the first driving portion A2 along the y-axis, so that the groove B2 has more space to move along the y-axis.

Moreover, the latch assembly 113 further includes first springs 113c, 113d and a second spring 113e, wherein the first spring 113c is disposed between the main structure 111a of the frame 111a and the first part 113a along the x-axis, a portion of the first spring 113c is placed in a hole H1 of the first part 113a, the first spring 113d is disposed between the main structure 111a of the frame 111 along the x-axis, a portion of the first spring 113d is placed in a hole H2 of the first part 113a, and the first springs 113c, 113d constantly drive the pushing portion A1 to protrude from the frame 111. Similarly, the second spring 113e is disposed between the second part 113b and the main structure 111a of the frame 111 along the y-axis, and a portion of the second spring 113e is placed in a hole H3 of the second part 113b.

Figure 4:
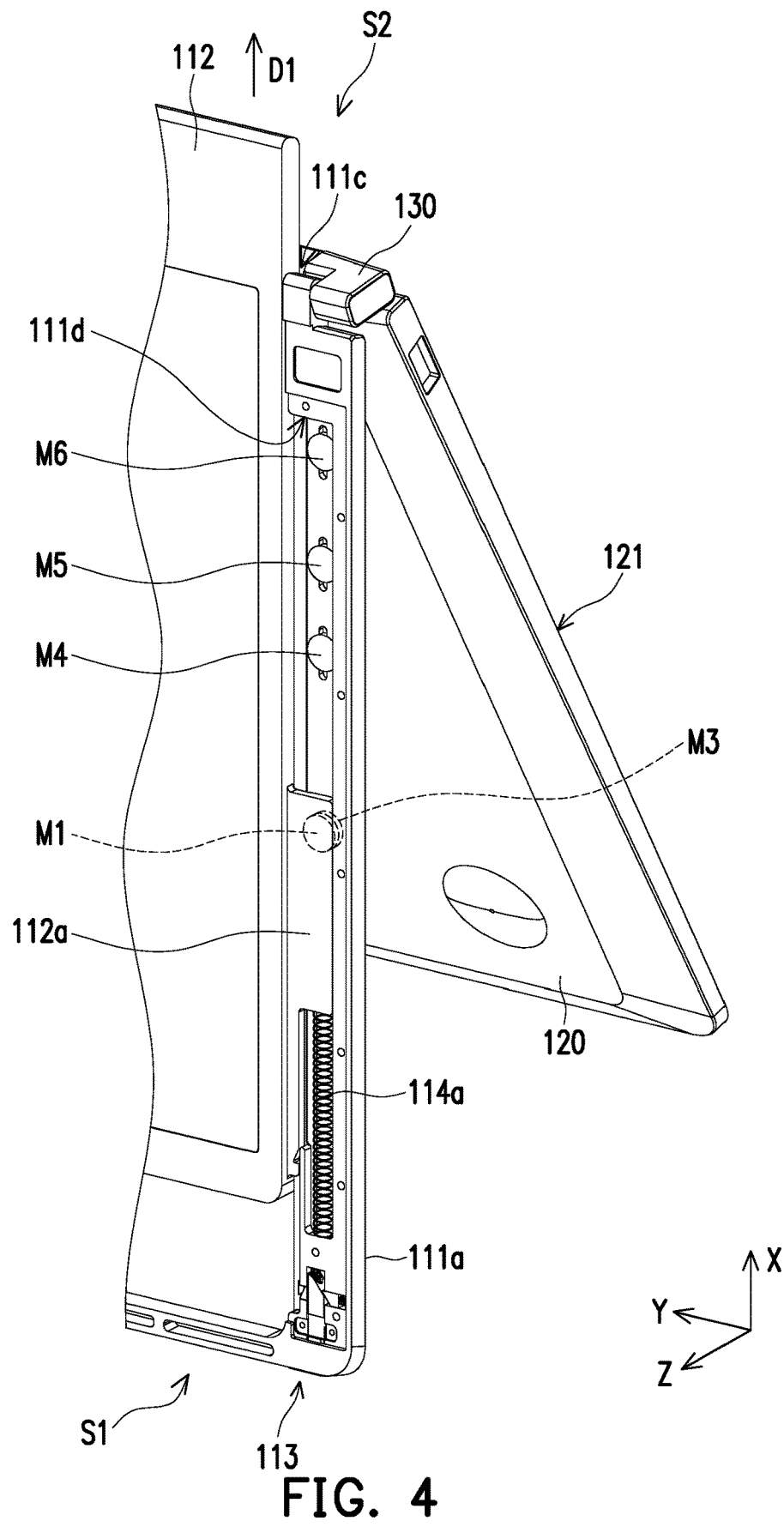
FIG. 4 and FIG. 5 are schematic partial views of different states of the electronic device depicted in FIG. 1.
Figure 5:
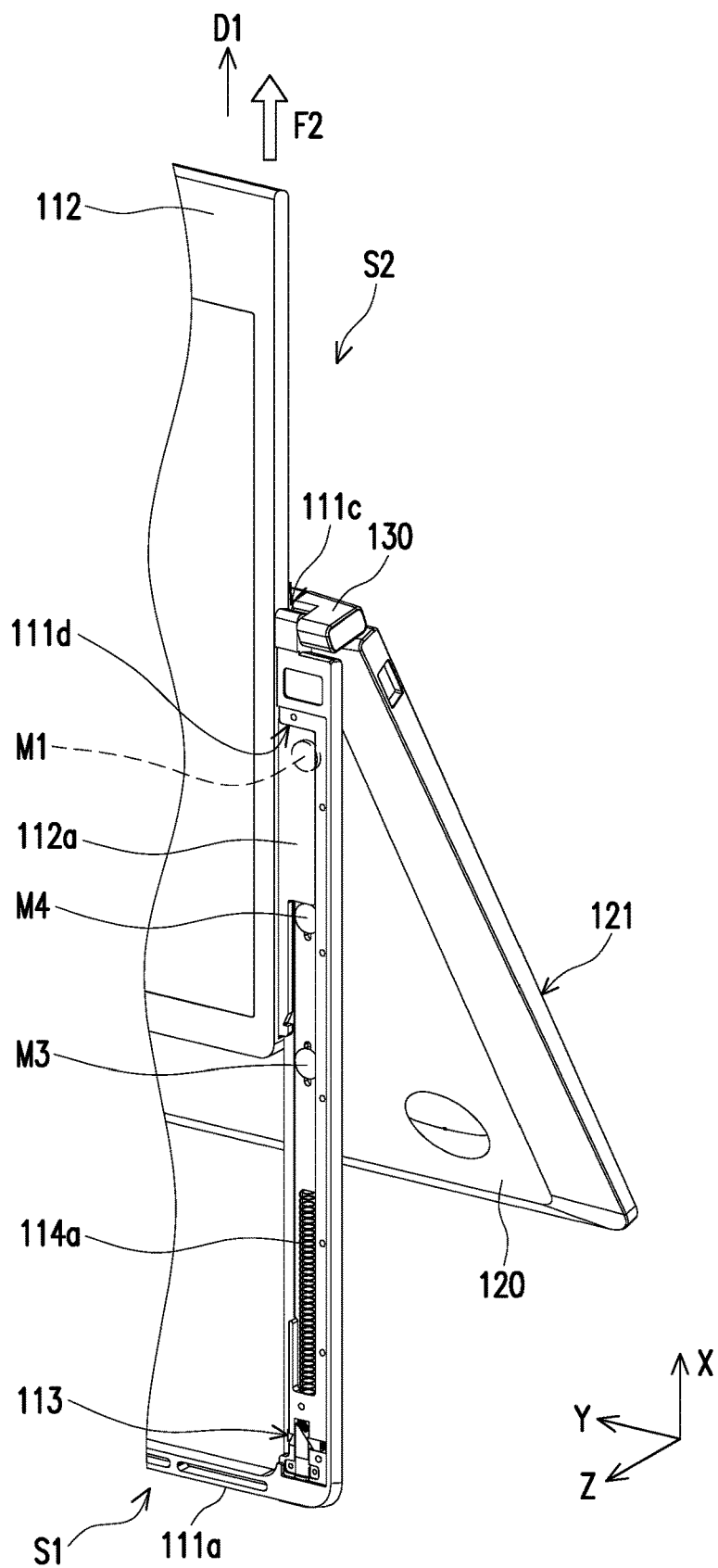

FIG. 4 and FIG. 5 are schematic partial views of different states of the electronic device depicted in FIG. 1. With reference to FIG. 2 and FIG. 4, thus, in the state shown in FIG. 2, the latching portion B1 of the second part 113b is substantially locked in the locking slot 112c of the display 112 to achieve the effects of locking the display 112, and therefore the display 112 may be considered as being completely retracted and fixed to the inner side of the U-shaped frame 111. Next, when the electronic device 100 leans against the platform (not shown) in the manner depicted in FIG. 1 and is then in the aforesaid tent state, the weight of the first body 110 allows the first body 110 to provide a force F1 to the pushing portion A1 in a direction D1; that is, the force F1 pushes the first part 113a in a positive x-axis. At this time, due to the interaction of the wedge-shaped surface A2 and the wedge-shaped surface B3, the first part 113a is able to push and move the second part 113b in a direction D2; that is, the second part 113b is driven to move in a negative y-axis, so as to retract the latching portion B1 from the locking slot 112c and ensure the latch assembly 113 to achieve the effects of releasing the display 112. Meanwhile, as shown in FIG. 2 to FIG. 4, the first springs 113c and 113d and the second spring 113e are configured to restore the positions of the first part 113a and the second part 113b.

With reference to FIG. 1, FIG. 3, and FIG. 4, it is worth mentioning that the electronic device 100 further includes third springs 114a and 114b located at the accommodation region R1 and engaged between the main structure 111a of the frame 111 and wing portions 112a and 112b of the display 112. When the display 112 is assembled within the frame 111, as shown in FIG. 1 and FIG. 3, the third springs 114a and 114b are in a compressed state. When the display 112 is released by the latch assembly 113 in the same manner as that described above, an elastic restoration force of the third springs 114a and 114b can drive the display 112 to move along the inner side of the frame 111; that is, the display 112 moves toward the second side S2 (in the direction D1) along the x-axis from the first side S1.

Moreover, with reference to FIG. 1 and FIG. 4, the display 112 provided in the present embodiment further has first positioning portions M1 and M2 respectively located at the wing portions 112a and 112b. The frame 111 further has a plurality of second positioning portions M3-M6 and M7-M10, and the second positioning portions M3-M6 and M7-M10 are respectively located on the moving paths of the wing portions 112a and 112b, and also located between a stopper portion 111d of the frame 111 and the latch assembly 113. When the display 112 is released by the latch assembly 113 and moved along the inner side of the frame 111 through the third springs 114a and 114b, the first positioning portions M1 and M2 and the corresponding second positioning portions M3-M6 and M7-M10 may achieve the temporary positioning effects. Here, the first positioning portions M1 and M2 are magnetic generating members or magnetic conductive members, for instance, and the second positioning portions M3-M6 and M7-M10 are magnetic conductive members or magnetic generating members, for instance. Hence, magnetic attraction allows the moving display 112 to be temporarily positioned at one of the second positioning portions M3-M6 and M7-M10.

With reference to FIG. 4 and FIG. 5, the related components are disposed symmetrically in the frame 111, and therefore only one side of the frame 111 (the right side of the frame 111 in the drawings) is described below. For instance, when the display 112 is released by the latch assembly 113 and driven by the third spring 114a to move in a direction of the positive x-axis, the first positioning portion M1 is temporarily positioned at the second positioning portion M3 (covered by the wing portion 112a in FIG. 3 and thus shown by a dashed outline), wherein the second positioning portion M3 is the closest to the latch assembly 113 due to the magnetic attraction, and a portion of the display 112 protrudes from the second side S2 of the frame 111. The user may then provide a force F2 according to actual needs, so as to drive the display 112 to continuously move in the positive x-axis, and the first positioning portion M1 is temporarily positioned at one of the second positioning portions M4-M6.

In other words, in the present embodiment, the elastic restoration force of the third springs 114a and 114b may be designed to be smaller than the magnetic attraction force between the first positioning portions M1, M2 and the second positioning portions M3-M6 and M7-M10; as such, according to the movement mode of the display 112, the released display 112 continuously moves along the inner side of the frame 111 until the first positioning portions M1, M2 arrive at the second positioning portions M3, M7, which are closest to the latch assembly 113. At that time, the magnetic attraction allows the first positioning portions M1, M2 to be temporarily positioned at the second positioning portions M3, M7. Thereafter, if the user has any additional demand, the user may manually provide the force F2 to adjust the height of the display 112 relative to the platform; namely, the first positioning portions M1, M2 are positioned at other second positioning portions M4-M6 and M8-M10. Meanwhile, in the frame 111, the stopper portion 111d stops on the moving paths of the wing portions 112a, 112b, thereby preventing the display 112 from being detached directly from the opening 111c of the frame 111.

It should be mentioned that the way to arrange the second positioning portions M4-M6 and M8-M10 as well as the number of and the distance among the second positioning portions M4-M6 and M8-M10 are not limited in the invention, and corresponding multi-point spacing may be accomplished according to the number of switching segments and the required viewing angle of the display 112. Certainly, in another embodiment that is not shown in the drawings, the second positioning portions may be designed to have a continuous structure to increase the margin of adjusting the display by the user.

Figure 6:
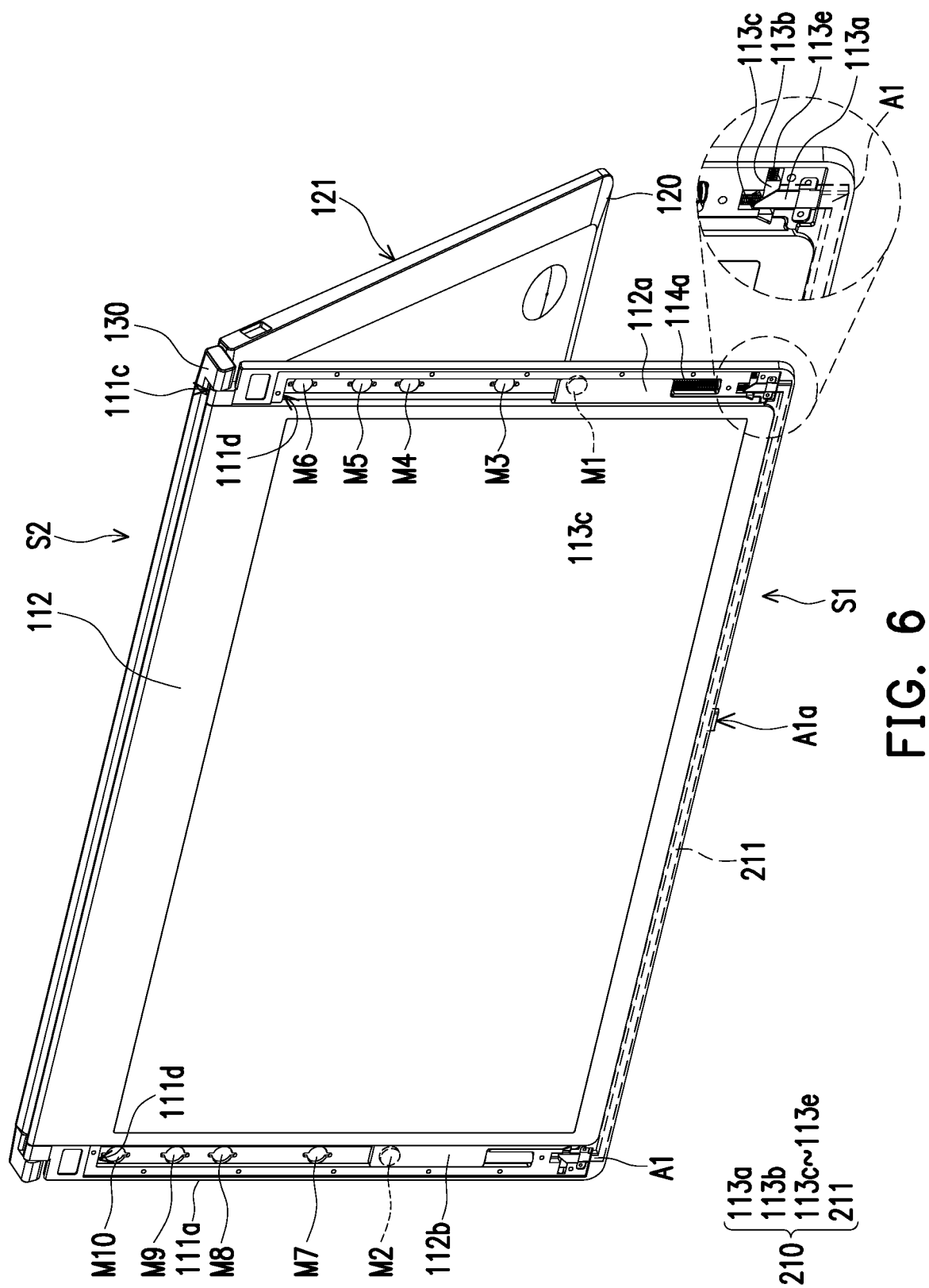
FIG. 6 is a schematic view of some components of an electronic device according to another embodiment of the invention.

FIG. 6 is a schematic view of some components of an electronic device according to another embodiment of the invention. With reference to FIG. 6, similar to the latch assembly provided in the previous embodiment, the latch assembly 210 of the electronic device 200 includes a pair of first parts 113a and a pair of second parts 113b with the same reference numbers as the components described in the previous embodiment. The difference between the previous embodiment and the present embodiment lies in that the latch assembly 210 provided in the present embodiment further includes a connecting member 211 connected between the first parts 113a, so that the latch assembly 210 and the first parts 113a are integrally formed. Meanwhile, the connecting member 211 has a pushing portion A1a protruding from the frame 111. That is, in this embodiment, the pair of pushing portions A1 provided in the previous embodiment is integrated at one place (i.e., the pushing portion A1a) by the connecting member 211, so as to prevent the possibility of only activating the latch assembly at one side if the frame 111 of the first body 110 leans against the platform in an inclined manner.

Figure 7:
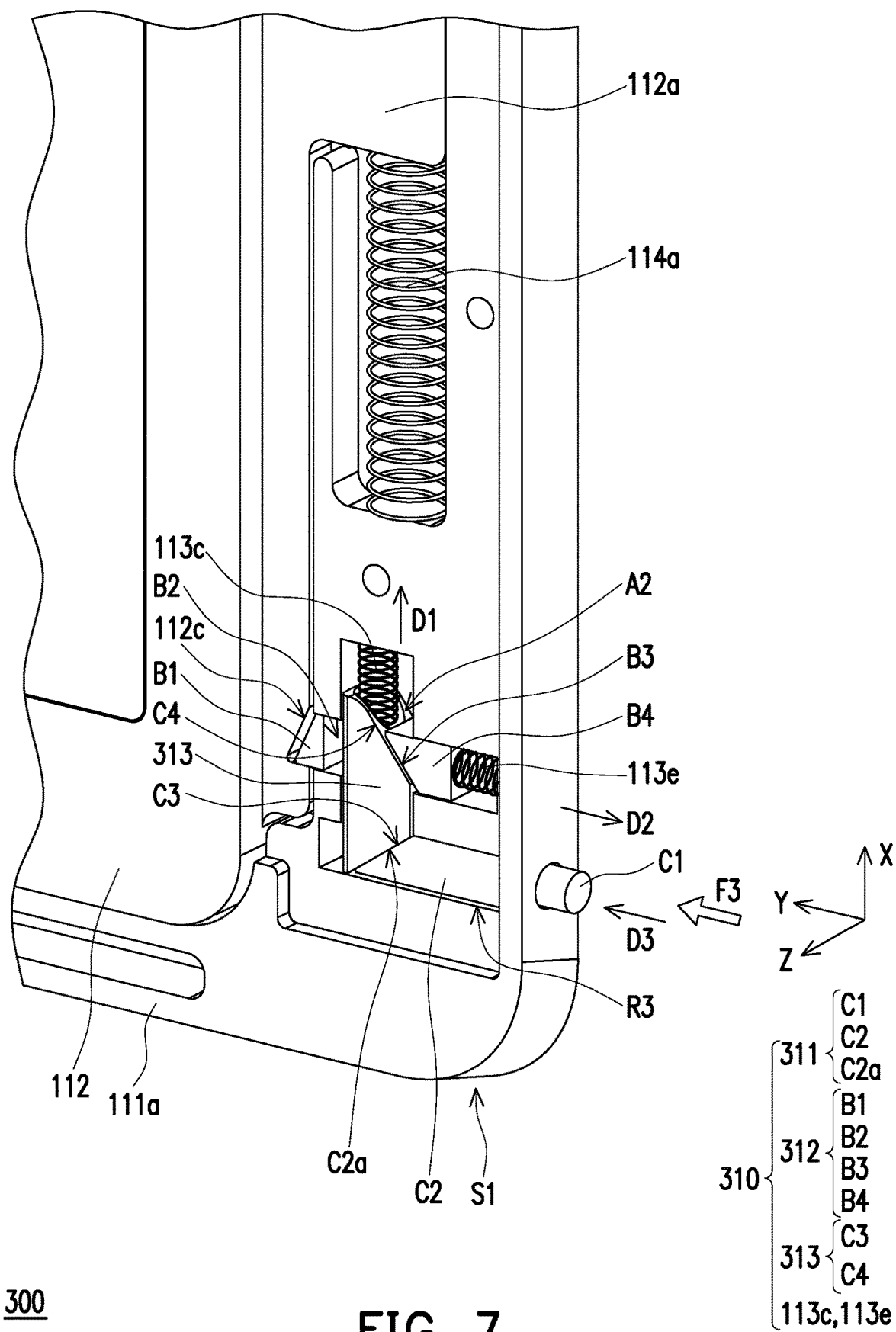
FIG. 7 is a schematic partial view of an electronic device according to another embodiment of the invention.

FIG. 7 is a schematic partial view of an electronic device according to another embodiment of the invention. With reference to FIG. 7, in the present embodiment, the latch assembly 310 of the electronic device 300 includes a first part 311, a second part 312, and a follower 313, wherein the first part 311 is movably disposed in the main structure 111a of the frame 111, the first part 311 has a pushing portion C1 and a first driving portion C2, the pushing portion C1 protrudes from the main structure 111a of the frame 111, and the first driving portion C2 has a wedge-shaped surface C2a. The second part 312 is movably disposed in the main structure 111a of the frame 111, and the second part 312 has a latching portion B1 and a second driving portion B4. The latching portion B1 is configured to be correspondingly locked to the locking slot 112c of the display 112, and the second driving portion B4 has a wedge-shaped surface B3. The follower 313 is movably coupled between the first part 311 and the second part 312, and the follower 313 has wedge-shaped surfaces C3 and C4 respectively connected to the wedge-shaped surface C2a and the wedge-shaped surface B3. Here, an axial movement direction of the first parts 311 is consistent with an axial movement direction of the second parts 312, and an axial movement direction of the follower 313 is orthogonal to the axial movement direction of the first parts 311 and orthogonal to the axial movement direction of the second parts 312.

Thereby, different from the previous embodiment where the latch assembly is activated when the frame 111 of the first body 110 leans against the platform, the present embodiment discloses that the pushing portion C1 is placed next to the first side S1 to avoid direct contact with the platform. Hence, the user can decide to keep the current location of the display 112 (i.e., the display 112 is still in a locked state) for viewing; in case of any additional demand, a force F3 may be exerted to the pushing portion C1, so as to allow the latch assembly 310 to release the display 112. That is, the follower 313 is disposed between the first parts 311 and the second parts 312 for achieving the effect of changing the direction of the force in the present embodiment. When the force F3 pushes the first parts 311 in the direction D3 (equivalent to the direction of the positive y-axis), the wedge-shaped surfaces C3 and C4 of the follower 313 allows the second parts 312 to smoothly move in the direction D2 (in the direction of the negative y-axis), so as to achieve the same effect of releasing the display 112 as the effect provided in the previous embodiment.

Figure 8A:
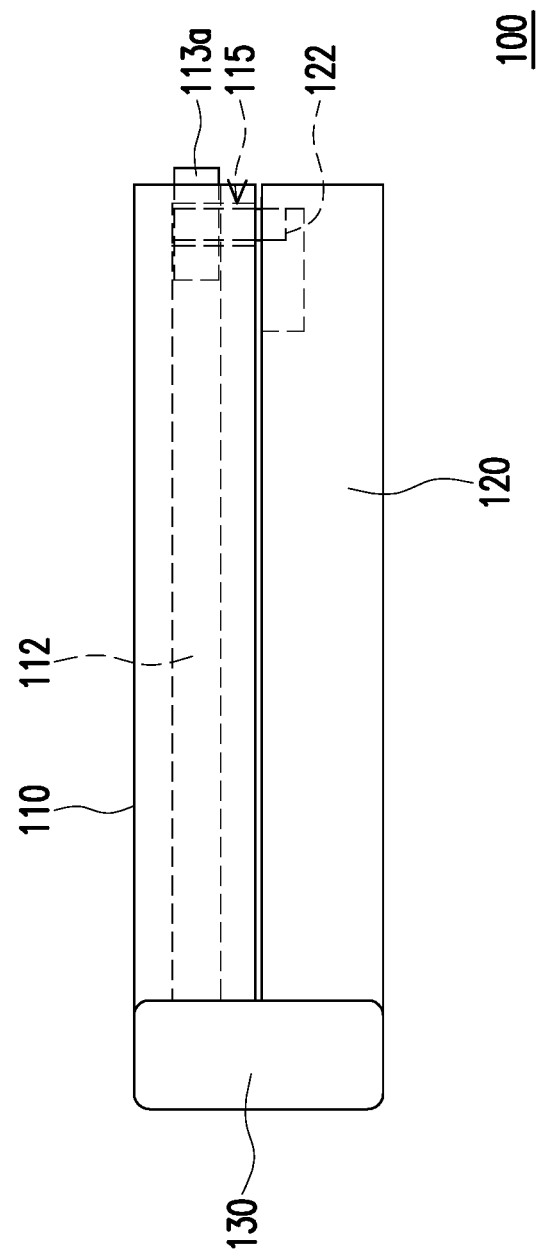
FIG. 8A and FIG. 8B are simple side views showing different states of an electronic device according to an embodiment of the invention.
Figure 8B:
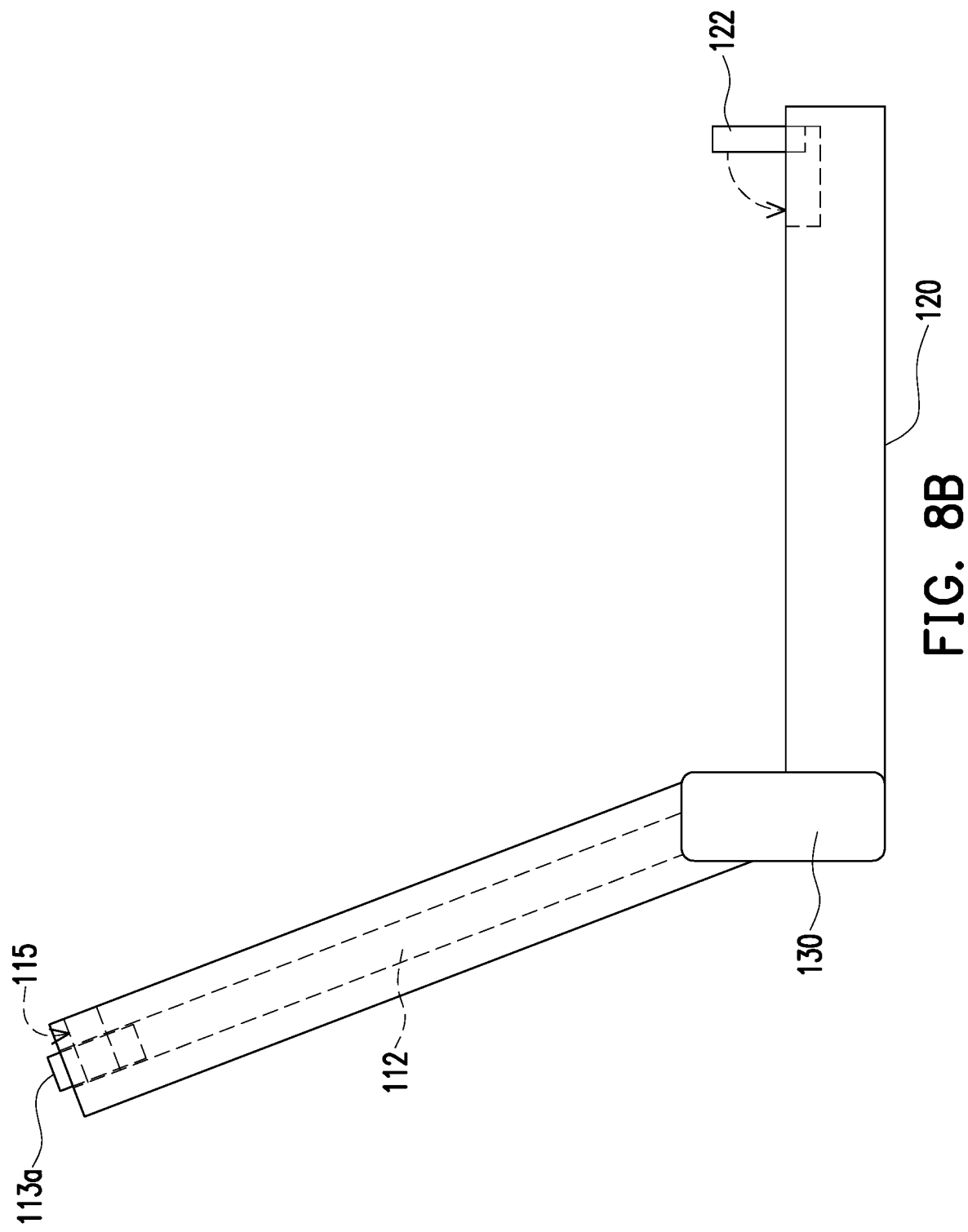

FIG. 8A and FIG. 8B are simple side views showing different states of an electronic device according to an embodiment of the invention. With reference to FIGS. 8A and 8B, the electronic device provided in previous embodiments shown in FIG. 1 to FIG. 5 is exemplified here, and the technical features described above are omitted to clearly describe the corresponding relations of the related components. Note that the above description of the components marked by the same reference numbers may still serve as a reference. In the present embodiment, the electronic device 100 further includes a pin 122 disposed at the second body 120 and corresponding to the first part 113a of the latch assembly 113. When the first body 110 and the second body 120 are folded together (as shown in FIG. 8A), the pin 122 is latched to the first part 113a of the latch assembly 113 to brake an operation of the latch assembly 113. By contrast, as long as the first body 110 is deployed (unfolded) relative to the second body 120, the braking relationship of the pin 122 with the latch assembly 113 is terminated. Here, a slot 115 is further disposed on the first body 110 (a similar slot is also disposed on the first part 113a), so that the pin 122 may be inserted into the slot 115 while the electronic device 100 is in the folded state. When the electronic device 100 is in a deployed (unfolded) state (as shown in FIG. 8B), the pin 122 may be placed in the second body 120, so that the user can well operate the electronic device 100.

Figure 9A:
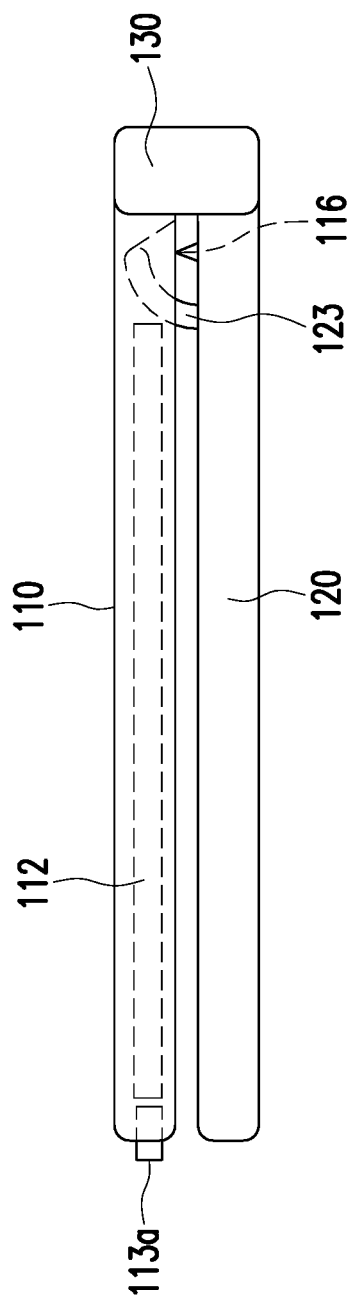

FIG. 9A and FIG. 9B are simple side views showing different states of an electronic device according to an embodiment of the invention. Different from the slot shown in FIG. 8A and FIG. 8B, the slot 116 in the present embodiment is disposed at the main structure 111a of the frame 111 and located on the moving path of the display 112; that is, the display 112 is located between the slot 116 and the first part 113a, and the pin 123 is disposed at the second body 120 and is adjacent to the hinge 130. When the first body 110 and the second body 120 are folded together, the pin 123 is inserted into the slot 116 and stops on the moving path of the display 112 to block the display 112; as such, even if the first part 113a is inadvertently touched, the display 112 is subject to the pin 123 and is thus not detached from the frame 111. On the contrary, when the first body 110 is deployed relative to the second body 120, the pin 123 no longer blocks the display 112.

To sum up, in the previous embodiments of the invention, the electronic device has the first body and the second body pivotally connected to each other, such that one body is adapted to be pivoted and rotated relative to the other body or even being flipped over. The first body is composed of the frame, the display, and the latch assembly. The display is assembled to the inner side of the frame, and the latch assembly is disposed within the frame to lock or release the display. Thereby, when the first body and the second body are rotated relatively, and the first body is flipped back to the rear of the second body, the first body and the second body are adapted to be placed on the platform in an upright position. At this time, the display is released by the latch assembly and moved along the inner side of the frame.

In one embodiment, the pushing portion of the latch assembly integrate the first parts at two sides of the frame as an integral structure; thereby, the user is able to unlock the display by pressing one pushing portion. In another embodiment, the pushing portion of the latch assembly is disposed next to the frame, and the user presses the pushing portion as needed. That is, the latch assembly is not activated as long as the first body leans against the platform, so as to increase the margin of using the electronic device.

Besides, the electronic device may determine to brake the latch assembly or not through the pin, so as to prevent the display from being detached from the frame in case of abnormal use demand.

Through the movable display and the latch assembly, the user may further adjusts the height or viewing angle of the display in the tent state (relative to the platform), so as to improve the convenience and comfort of operating of the electronic device in the tent state.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An electronic device comprising:
   a first body comprising
      a frame;
      a display assembled to an inner side of the frame;
      a latch assembly disposed within the frame to lock or release the display; and
   a second body pivotally connected to the first body, wherein when the first body and the second body are rotated relatively to a tent position, the display is released by the latch assembly so as to be moved along the frame,
   wherein the latch assembly comprises:
   a first part movably disposed in the frame, the first part having a pushing portion and a first driving portion, the pushing portion being protruded out of the frame; and
   a second part movably disposed in the frame, the second part having a latching portion and a second driving portion, the first driving portion being movably engaged to the second driving portion, the latching portion being configured to be correspondingly locked to a locking slot of the display,
   wherein the first part is adapted to move via a force applied to the pushing portion, such that the first part pushes the second part via the engagement of the first driving portion and the second driving portion, and the latching portion is retracted from the locking slot of the display to release the display.

2. The electronic device as recited in claim 1, wherein the frame has a first side and a second side opposite to each other, the first side is away from a pivotal connection portion of the first body and the second body, the second side is adjacent to the pivotal connection portion of the first body the second body, the latch assembly has the pushing portion located at the first side, the frame further has an opening located at the second side, the latch assembly is adapted to release the display through the pushing portion receiving a force, and at least one portion of the display is moved out of the frame through the opening.

3. The electronic device as recited in claim 1, wherein the first part is movably disposed in the frame along a first axis, the second part is movably disposed in the frame along a second axis, and each of the first driving portion and the second driving portion has a wedge-shaped surface inclined to the first axis and the second axis.

4. The electronic device as recited in claim 3, wherein the first axis is orthogonal to the second axis.

5. The electronic device as recited in claim 3, wherein the second part has a groove, and the first driving portion of the first part is movably engaged to the groove.

6. The electronic device as recited in claim 5, wherein a size of the groove along the second axis is greater than a size of the first driving portion along the second axis.

7. The electronic device as recited in claim 3, wherein the latch assembly further comprises a first spring and a second spring, the first spring is disposed between the frame and the first part along the first axis, the first spring constantly drives the pushing portion to protrude from the frame, and the second spring is disposed between the second part and the frame along the second axis.

8. The electronic device as recited in claim 1, further comprising a spring disposed between the frame and a wing portion of the display, when the display is assembled within the frame, the spring is in a compressed state, and when the latch assembly releases the display, the spring drives the display to move along the inner side of the frame.

9. The electronic device as recited in claim 1, wherein the display has a wing portion, and the frame further has a stopper portion disposed on a moving path of the wing portion.

10. The electronic device as recited in claim 9, wherein the display further has a first positioning portion located at the wing portion, the frame further has at least one second positioning portion located on the moving path of the wing portion and between the stopper portion and the latch assembly, and when the display is released by the latch assembly, the display moves along the inner side of the frame until the first positioning portion is temporarily positioned at the at least one second positioning portion.

11. The electronic device as recited in claim 10, wherein the frame has a plurality of second positioning portions,
   wherein the first positioning portion is temporarily positioned at one of the second positioning portions being closest to the latch assembly after the display being released by the latch assembly,
   wherein the first positioning portion is moved from the one of the second positioning portions and positioned at another one of the second positioning portions while the display being forced by a user.

12. The electronic device as recited in claim 10, wherein the first positioning portion is a magnetic generating member and the second positioning portion is a magnetic conductive member, or the first positioning portion is a magnetic conductive member and the second positioning portion is a magnetic generating member.

13. The electronic device as recited in claim 1, further comprising a pin disposed at the second body and corresponding to the latch assembly, wherein when the first body and the second body are folded together, the pin is latched to the latch assembly to brake an operation of the latch assembly.

14. The electronic device as recited in claim 1, further comprising a pin disposed at the second body, the first body further comprising a slot disposed at the frame and located on a moving path of the display, wherein when the first body and the second body are folded together, the pin is inserted into the slot to block the display.

15. The electronic device as recited in claim 1, wherein the latch assembly comprises:
   a pair of first parts respectively and movably disposed at two sides within the frame, each of the pair of first parts having the first driving portion;
   a pair of second parts respectively and movably disposed at two sides within the frame, each of the pair of second parts having the latching portion and the second driving portion; and
   a connecting member connected between the pair of first parts, the connecting member and the pair of first parts being integrally formed, the connecting member having the pushing portion being protruded out of the frame.

16. The electronic device as recited in claim 1, wherein the latch assembly further comprises:

a follower movably coupled between the first part and the second part, the follower having a pair of wedge-shaped surfaces respectively connected to a wedge-shaped surface of the first driving portion and a wedge-shaped surface of the second driving portion, an axial movement direction of the first part is consistent with an axial movement direction of the second part.

17. The electronic device as recited in claim 16, wherein an axial movement direction of the follower is orthogonal to an axial movement direction of the first part and orthogonal to an axial movement direction of the second part.

18. An electronic device comprising:
    a first body comprising:
      a frame having a first side and a second side opposite to each other;
      a display assembled to an inner side of the frame;
      a latch assembly disposed inside the frame to lock or release the display; and
    a second body, pivotally connected to the first body, wherein the first side of the frame is away from a pivotal connection portion of the first body and the second body, the second side of the frame is adjacent to the pivotal connection portion of the first body and the second body, when the first body and the second body are pivoted relatively to a tent position, the display is released by the latch assembly to move toward the second side of the frame,
    wherein the latch assembly comprises:
    a first part movably disposed in the frame, the first part having a pushing portion and a first driving portion, the pushing portion being protruded out of the frame; and
    a second part movably disposed in the frame, the second part having a latching portion and a second driving portion, the first driving portion being movably engaged to the second driving portion, the latching portion being configured to be correspondingly locked to a locking slot of the display,
      wherein the first part is adapted to move via a force applied to the pushing portion, such that the first part pushes the second part via the engagement of the first driving portion and the second driving portion, and the latching portion is retracted from the locking slot of the display to release the display.

19. The electronic device as recited in claim 18, wherein the first part is movably disposed in the frame along a first axis, the second part is movably disposed in the frame along a second axis, and each of the first driving portion and the second driving portion has a wedge-shaped surface inclined to the first axis and the second axis.

20. The electronic device as recited in claim 18, further comprising a spring disposed between the frame and a wing portion of the display, when the display is assembled within the frame, the spring is in a compressed state, and when the latch assembly releases the display, the spring drives the display to move along the inner side of the frame.

21. The electronic device as recited in claim 18, wherein the display has a wing portion and further has a first positioning portion located at the wing portion, and the frame further has a stopper portion and at least one second positioning portion located on a moving path of the wing portion and between the stopper portion and the latch assembly, when the display is released by the latch assembly, the display moves along the inner side of the frame until the first positioning portion is temporarily positioned at the at least one second positioning portion.

22. The electronic device as recited in claim 21, wherein the frame has a plurality of second positioning portions,
    wherein the first positioning portion is temporarily positioned at one of the second positioning portions being closest to the latch assembly after the display being released by the latch assembly,
    wherein the first positioning portion is moved from the one of the second positioning portions and positioned at another one of the second positioning portions while the display being forced by a user.

23. The electronic device as recited in claim 18, further comprising a pin movably disposed at the second body and configured to brake the latch assembly or the display.

\* \* \* \* \*